United States Patent
Graf et al.

(10) Patent No.: US 6,685,252 B2
(45) Date of Patent: Feb. 3, 2004

(54) SEAL ARRANGEMENT FOR A FOLDING ROOF OF A HARDTOP VEHICLE AND METHOD FOR MAKING A SEAL ARRANGEMENT

(75) Inventors: Thomas Graf, Sindelfingen (DE); Uwe Wacker, Schoenaich (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/206,794

(22) Filed: Jul. 29, 2002

(65) Prior Publication Data

US 2003/0030219 A1 Feb. 13, 2003

(30) Foreign Application Priority Data

Jul. 30, 2001 (DE) .......................................... 101 37 032

(51) Int. Cl.[7] .................................................. B60J 7/08
(52) U.S. Cl. ...................... 296/108; 296/93; 49/475.1; 49/484.1; 49/489.1; 49/498.1
(58) Field of Search .............................. 296/93, 107.04, 296/108, 146.14; 49/475.1, 484.1, 489.1, 498.1

(56) References Cited

U.S. PATENT DOCUMENTS

| | | | | |
|---|---|---|---|---|
| 1,842,586 A | * | 1/1932 | Davidson ..................... 296/93 |
| 4,729,593 A | * | 3/1988 | Nisiguchi et al. ....... 296/107.04 |
| 4,784,428 A | | 11/1988 | Moy et al. |
| 6,019,416 A | | 2/2000 | Beierl |
| 6,123,381 A | | 9/2000 | Schenk |
| 6,131,988 A | | 10/2000 | Queveau et al. |
| 6,189,950 B1 | * | 2/2001 | Kawazoe et al. ....... 296/107.04 |
| 6,213,536 B1 | * | 4/2001 | Raisch et al. .......... 296/107.04 |
| 6,419,295 B1 | * | 7/2002 | Neubrand ................... 296/108 |
| 6,598,349 B1 | * | 7/2003 | Balbaugh et al. .......... 49/475.1 |

FOREIGN PATENT DOCUMENTS

| | | | | |
|---|---|---|---|---|
| DE | 4039444 | | 6/1992 | |
| DE | 19635537 | | 1/1998 | |
| DE | 197 51 660 C1 | | 3/1999 | |
| WO | WO 00/03885 | * | 1/2000 | .............. 296/146.9 |
| WO | WO 01/21425 A1 | * | 3/2003 | ............ 296/107.04 |

* cited by examiner

*Primary Examiner*—D. Glenn Dayoan
*Assistant Examiner*—Lori L Coletta
(74) *Attorney, Agent, or Firm*—Crowell & Moring LLP

(57) ABSTRACT

A seal arrangement is used for a folding roof of a hardtop vehicle, which has a front roof part, a rear roof part and a frame. The rear roof part can be moved from a closed position into a storage position inside a rear luggage space. The frame has a rear window and is pivotable in relation to the lateral roof pillars. The seal arrangement includes a sealing strip at least partially disposed in a region adjacent to a front end of the rear window, and an additional seal extending under the rear window and from the region of the pivoting axis to a rear edge of the rear window. The sealing strip extends under the front roof part and the lateral roof pillars and into a region of a pivoting axis of the rear window. The sealing strip includes a main seal having a surface, a comfort seal, and a channel disposed between the main seal and comfort seal. The additional seal includes a main seal having a surface, a comfort seal, a channel disposed between the main seal and comfort seal of the additional seal, and an additional channel in the region of the pivoting axis, the additional channel being in alignment with the channel of the sealing strip and communicating with the channel between the main seal and the comfort seal of the additional seal. The two main seals adjoin one another in the region of the pivoting axis with the surfaces abutting each other.

14 Claims, 2 Drawing Sheets

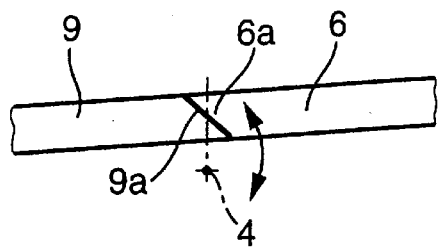
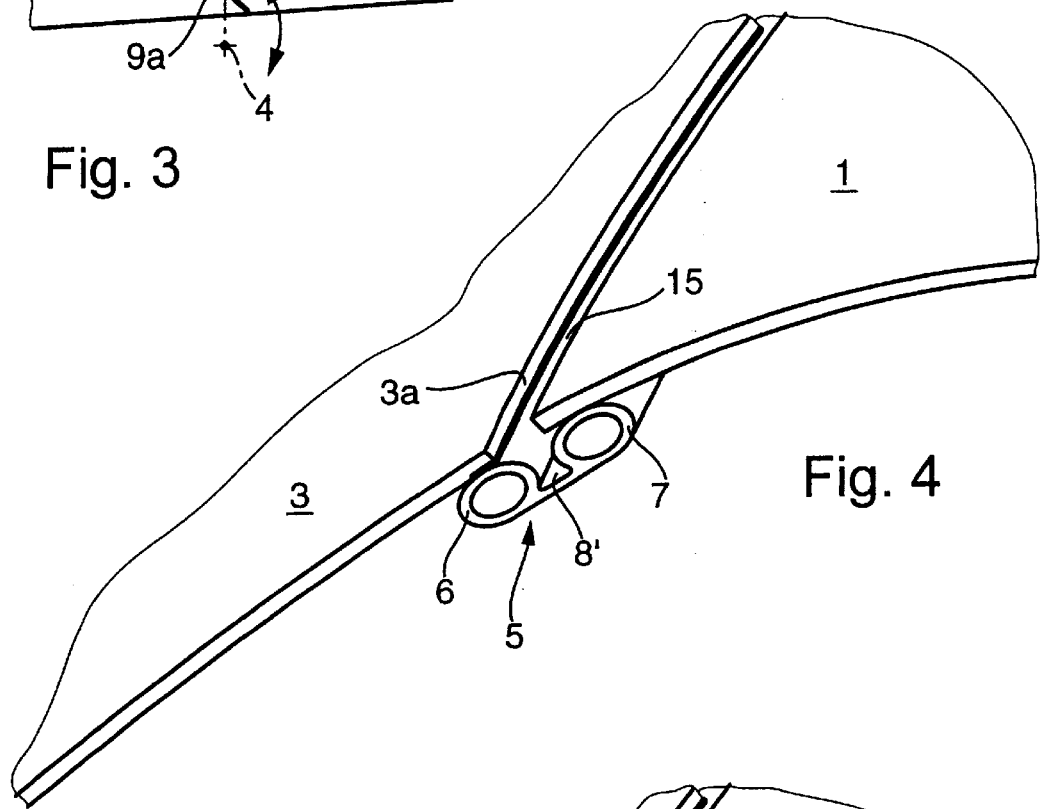
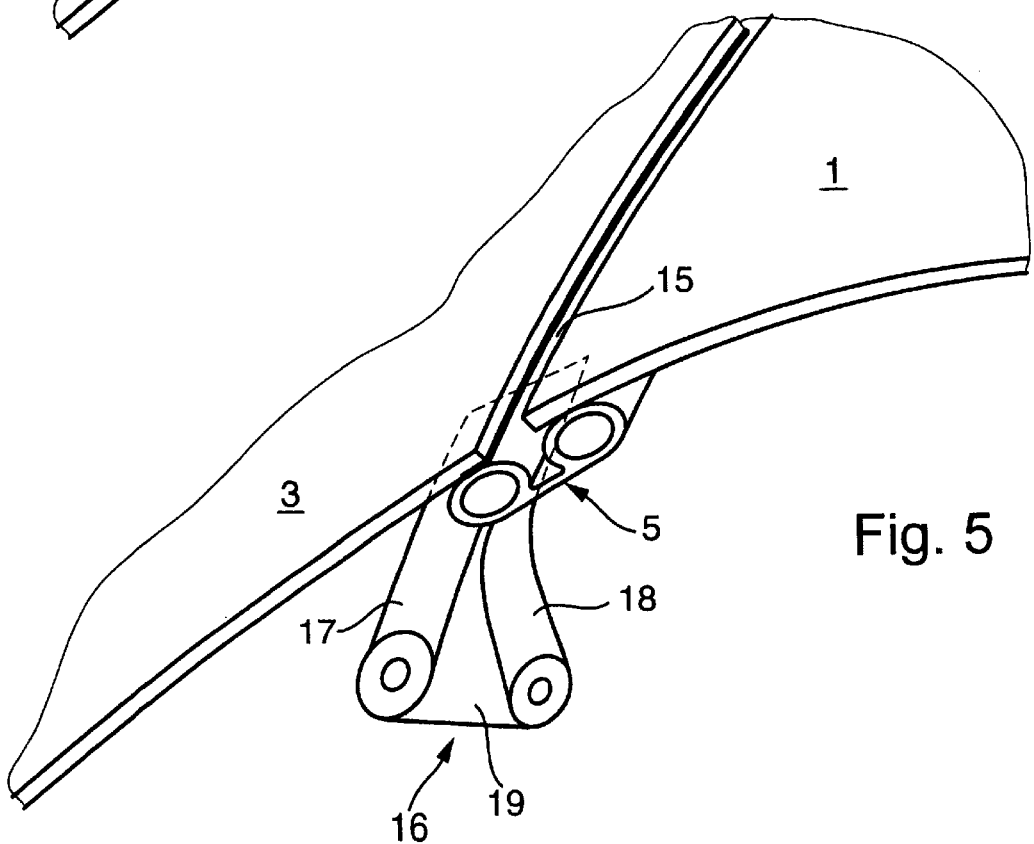

SEAL ARRANGEMENT FOR A FOLDING ROOF OF A HARDTOP VEHICLE AND METHOD FOR MAKING A SEAL ARRANGEMENT

This application claims the priority of Federal Republic of Germany Patent Document No. 101 37 032.6, filed Jul. 30, 2001, the disclosure of which is expressly incorporated by reference herein.

BACKGROUND AND SUMMARY OF THE INVENTION

The invention relates to a seal arrangement for a folding roof of a hardtop vehicle with a front roof part and a rear roof part which can, via pivotable lateral roof pillars, be moved from a closed position into a storage position inside a rear luggage space. The rear roof part has a frame with a rear window, which frame is pivotable in relation to the lateral roof pillars. The invention further relates to a method for making a seal arrangement.

DE 197 51 660 C1 discloses a device for storing the roof of a hardtop vehicle. The advantage of such an arrangement is that the roof can be stored in a space-saving manner, because the front roof part and the rear roof part with the rear window can be curved in the same direction and stored in the rear region of the vehicle.

It is an object of the present invention to provide a seal for such a roof arrangement, which seal ensures that the roof is impermeable in the closed state and that water can be carried away in such a manner that the interior remains unaffected.

For the new sealing arrangement, the front region of the rear window which meets the front roof part, has a sealing strip which extends under the front roof part and the lateral roof pillars. The sealing strip includes a main seal and a comfort seal with a channel lying therebetween, and extends into the region of the pivoting axis of the rear window. The lateral roof pillars have a seal extending under the rear window, which seal extends from the region of the pivoting axis to the rear edge of the rear window. The seal likewise includes a main seal, a comfort seal and a channel lying therebetween. The two main seals adjoin one another in the region of the pivoting axis with their mutually facing abutting locations. The seal arranged on the lateral roof pillars is provided with an additional channel in this region, which is in alignment with the channel of the sealing strip and, under the main seal, communicates with the channel between the main seal and the comfort seal of the sealing strip.

By virtue of this configuration, it is possible, in spite of the mobility of the rear window, to simply and reliably conduct rain or washing water downwards out of the roof region without complex measures.

In a development of the invention, the main seals can be cut obliquely at their abutting locations. When the pivoting movement of the rear window takes place, the abutting locations are laid under pressure against each other and are thus only loaded under pressure when the pivoting movement takes place to reduce wear.

In a development of the invention, in order to bring about water guidance in the leakage channels in the pivoting region under the main seals, a collecting trough can be provided under the main seal at the transition location, which trough serves for the onward guidance of water.

Other objects, advantages and novel features of the present invention will become apparent from the following detailed description of the invention when considered in conjunction with the accompanying drawings.

BRIEF DESCRIPTION OF THE DRAWINGS

FIG. 3 shows an enlarged illustration of a partial longitudinal section through the main seals in the region of the pivoting axis.

FIG. 4 shows an enlarged partial illustration of a longitudinal section through the upper seal of the pivotable rear window according to the detail IV.

FIG. 5 shows an enlarged detail of a section through the roof arrangement and seal arrangement in the region V in FIG. 1.

DETAILED DESCRIPTION OF THE DRAWINGS

Figure 1:
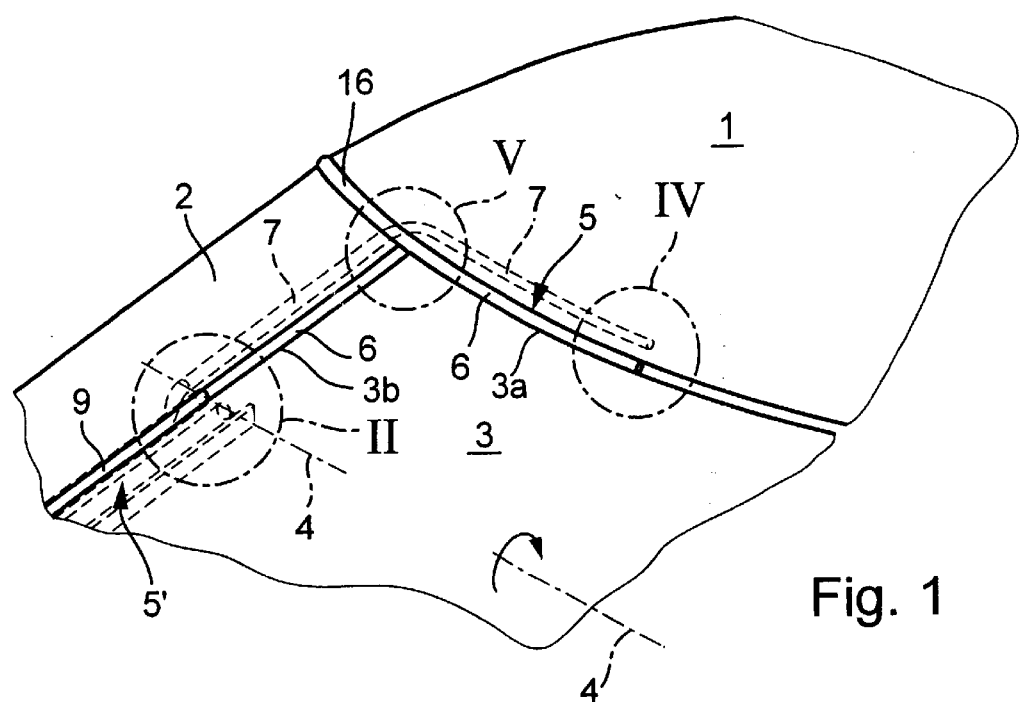
FIG. 1 shows a diagrammatic perspective partial illustration of a rear view of the seal arrangement according to the invention.

In FIG. 1, the folding roof of a hardtop vehicle (not illustrated in detail) includes a firm front roof part 1, lateral roof pillars 2 (C pillars) which can be pivoted away backwards and a frame (not illustrated in detail) which is equipped with a rear window 3. The frame can be pivoted clockwise about the axis 4 in relation to the lateral roof pillars in order to come to lie with the same curvature underneath the front roof part 1, when the hardtop roof is, by pivoting away the lateral roof pillars 2, brought from the closed position illustrated in FIG. 1 into a storage space inside the rear luggage space (not shown). In this connection, this storing procedure and the roof arrangement is the same as the storage device disclosed in DE 197 51 660 C1 as far as the movement operations are concerned.

Figure 2:
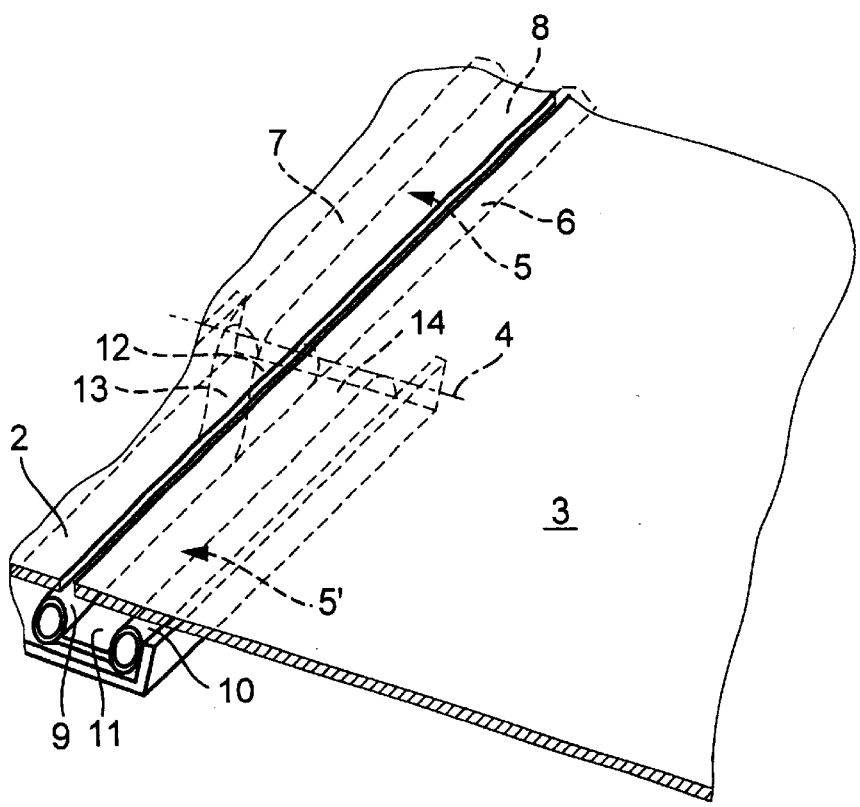
FIG. 2 shows an enlarged partial view of the region II in FIG. 1.

Since the rear window 3 with its frame is pivotable about the axis 4 and therefore cannot be firmly and permanently sealed either in the lateral roof pillars 2 or in relation to the front roof part 1, a sealing strip 5 is provided with the rear window 3 or with its frame. The strip runs around along and at a distance in front of the entire upper edge 3a and has a main seal 6, a comfort seal 7 and a channel 8 lying therebetween for guiding water. The sealing strip 5 is guided around the two upper corners of the rear window 3 and, at the side edges 3b of the windows, into the region of the pivoting axis 4. The design on the right side of the window 3 is mirror-inverted in relation to that shown in the left side. On each side, as shown in FIG. 2, the sealing strip 5 adjoins a seal 5'. The seal 5' is likewise constructed from a main seal 9, a comfort seal 10 extending further into the interior of the window, and a channel 11 lying therebetween for guiding leakage water. In this connection, the seal 5' has a further channel 12 which is bounded on the outside by an additional seal 13 which in turn adjoins the comfort seal 7 of the sealing strip 5. Provided underneath the two main seals 6 and 9 is a collecting trough 14, by means of which the water, which flows downwards from the upper region of the window 3 through the channel 8 of the sealing strip 5, can be guided into the leakage water channel 11 of the seal 5' and then from there to a drainage point.

In this connection, FIG. 3 shows that the two main seals 6 and 9 adjoin one another via obliquely cut abutting surfaces 6a and 9a which are in each case arranged vertically above the pivoting axis 4. When the window 3 is pivoted about the pivoting axis 4, the abutting surface 6a comes into contact with the abutting surface 9a under pressure only when the window is located just before the closing position. In this way, wear is prevented at the abutting locations of the seals. It is moreover possible for wedge-shaped guide elements and a stop, which improve the run-in of the two wedges when a pivoting movement takes place, to be integrated into the sealing strip 5 and into the seal 5', at least in the region of the main seals 6 and 9. In this way, perfect, reliable sealing can be achieved at the abutting locations 6a and 9a. The abutting location between the seal 13 and the comfort seal 7 of the sealing strip can be configured in the same way.

FIG. 4 shows the sealing strip 5 underneath the front roof part 1, against which the sealing strip 5 bears with its comfort seal 7. As FIG. 4 shows, the channel 8' lying between the comfort seal 7 and the main seal 6 runs in the region of the gap 15 between the front roof part 1 and the pivotable window 3. As this illustration shows, the sealing strip 5 is firmly connected to the window 3 and is supported by a frame (not shown) which surrounds the window 3.

FIG. 5 shows that, in the corner region where the lateral roof pillars 2, the front roof part 1 and the rear window 3 intersect, there is an overlap between the sealing strip 5 on the rear window and the seal 16 which is provided for sealing between the lateral roof pillar 2 (C pillar) and the front roof part 1. This seal 16 in turn also has a main seal 17, a comfort seal 18 and a leakage water channel 19 lying therebetween.

What is claimed:

1. A seal arrangement for a folding roof of a hardtop vehicle with a front roof part and a rear roof part which can, via pivotable lateral roof pillars, be moved from a closed position into a storage position inside a rear luggage space, a frame with a rear window, which frame is pivotable in relation to the lateral roof pillars, being provided in the rear roof part, wherein a front region of the rear window is, which meets the front roof part, provided with a sealing strip which extends under the front roof part and the lateral roof pillars, includes a main seal and a comfort seal with a channel lying therebetween, and extends into the region of the pivoting axis of the rear window, wherein the lateral roof pillars have a seal extending under the rear window, which seal extends from the region of the pivoting axis to the rear edge of the rear window and likewise includes a main seal, a comfort seal and a channel lying therebetween, and wherein the two main seals adjoin one another in the region of the pivoting axis with their mutually facing abutting locations, and the seal arranged on the lateral roof pillar is provided with an additional channel in this region, which is in alignment with the channel of the sealing strip and, through under the main seal, communicates with the channel between the main seal and the comfort seal of the seal.

2. The seal arrangement according to claim 1, wherein the main seals and the comfort seals in each case includes sealing beads.

3. The seal arrangement according to claim 2, wherein the two main seals are cut obliquely at their abutting locations and are arranged vertically above the pivoting axis.

4. The seal arrangement according to claim 1, wherein the additional channel is formed by an additional seal which is arranged on the seal and is in alignment with the comfort seal of the sealing strip.

5. The seal arrangement according to claim 1, wherein, at a transition location from the channel into the channel of the seal, a collecting trough is provided under the main seals, which likewise lies in the region of the pivoting axis.

6. A seal arrangement for a folding roof of a hardtop vehicle, wherein the folding roof has a front roof part, a rear roof part and a frame, wherein the rear roof part can be moved from a closed position into a storage position inside a rear luggage space, and wherein the frame has a rear window and is pivotable in relation to the lateral roof pillars, the seal arrangement comprising:
    a sealing strip at least partially disposed in a region adjacent to a front end of the rear window, the sealing strip extending under the front roof part and the lateral roof pillars and into a region adjacent to a pivoting axis of the rear window, the sealing strip including
        a main seal having a surface,
        a comfort seal, and
        a channel disposed between the main seal and comfort seal; and
    an additional seal extending under the rear window and from the region adjacent to the pivoting axis to a rear edge of the rear window, the additional seal including
        a main seal having a surface,
        a comfort seal,
        a channel disposed between the main seal and comfort seal of the additional seal, and
        an additional channel in the region adjacent to the pivoting axis, the additional channel being in alignment with the channel of the sealing strip and communicating with the channel between the main seal and the comfort seal of the additional seal, wherein the two main seals adjoin one another in the region adjacent to the pivoting axis with the surfaces abutting each other.

7. The seal arrangement according to claim 6, wherein the main seals and the comfort seals each include a sealing bead.

8. The seal arrangement according to claim 7, wherein the surfaces of the two main seals each have a complementary oblique angle and are arranged vertically above the pivoting axis.

9. The seal arrangement according to claim 6, further comprising an additional seal, wherein the additional channel is formed by the additional seal which is arranged on the additional seal and is in alignment with the comfort seal of the sealing strip.

10. The seal arrangement according to claim 9, further comprising a collecting trough at a transition location from the additional channel into the channel of the additional seal, the collecting trough being under the main seals in the region adjacent to the pivoting axis.

11. A method for making a seal arrangement for a folding roof of a hardtop vehicle, wherein the folding roof has a front roof part, a rear roof part and a frame, wherein the rear roof part can be moved from a closed position into a storage position inside a rear luggage space, and wherein the frame has a rear window and is pivotable in relation to the lateral roof pillars, the method comprising:
    at least partially disposing a sealing strip in a region adjacent to a front end of the rear window, the sealing strip extending under the front roof part and the lateral roof pillars and into a region adjacent to a pivoting axis of the rear window, the sealing strip including
        a main seal having a surface,
        a comfort seal, and
        a channel disposed between the main seal and comfort seal;
    disposing an additional seal under the rear window and from the region adjacent to the pivoting axis to a rear edge of the rear window, the additional seal including
        a main seal having a surface,
        a comfort seal,
        a channel disposed between the main seal and comfort seal of the additional seal, and an additional channel in the region adjacent to the pivoting axis, the additional channel being in alignment with the channel of the sealing strip and communicating with the channel between the main seal and the comfort seal of the additional seal; and adjoining the two main seals in the region adjacent to the pivoting axis with the surfaces abutting each other.

12. The method according to claim 11, further comprising arranging the surfaces of the two main seals vertically above the pivoting axis.

13. The method according to claim 11, further comprising forming the additional channel by an additional seal which is arranged on the additional seal and is in alignment with the comfort seal of the sealing strip.

14. The method according to claim 13, further comprising providing a collecting trough at a transition location from the additional channel into the channel of the additional seal, the collecting trough being under the main seals in the region adjacent to the pivoting axis.

* * * * *